US011880850B2

(12) United States Patent
Laserson et al.

(10) Patent No.: US 11,880,850 B2
(45) Date of Patent: Jan. 23, 2024

(54) CROSS-ENTITY CHANNEL INTEGRATION SERVICES

(71) Applicant: NCR Voyix Corporation, Atlanta, GA (US)

(72) Inventors: Itamar David Laserson, Givat Shmuel (IL); Matthew Robert Burris, Atlanta, GA (US); Christopher John Costello, Suwanee, GA (US); Norman Leonard Trujillo, Frisco, TX (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 17/333,139

(22) Filed: May 28, 2021

(65) Prior Publication Data

US 2022/0383339 A1 Dec. 1, 2022

(51) Int. Cl.
*G06Q 30/02* (2023.01)
*G06Q 30/0201* (2023.01)
*G06Q 10/10* (2023.01)
*G06Q 30/0242* (2023.01)
*G06Q 10/087* (2023.01)
*G06Q 40/12* (2023.01)
*G06Q 30/0272* (2023.01)

(52) U.S. Cl.
CPC ....... *G06Q 30/0201* (2013.01); *G06Q 10/087* (2013.01); *G06Q 10/10* (2013.01); *G06Q 30/0246* (2013.01); *G06Q 40/12* (2013.12); *G06Q 30/0272* (2013.01)

(58) Field of Classification Search
CPC ....... G06Q 30/0207–30/0277; G06Q 30/0201; G06Q 10/087; G06Q 10/10; G06Q 30/0246; G06Q 40/12; G06Q 30/0272
See application file for complete search history.

(56) References Cited

U.S. PATENT DOCUMENTS

| 9,495,636 | B2 * | 11/2016 | Torgersrud | G06N 5/02 |
| 10,346,874 | B2 * | 7/2019 | Boal | G06Q 30/0207 |
| 10,755,291 | B1 * | 8/2020 | Sharma | G06Q 30/0201 |
| 10,846,653 | B2 * | 11/2020 | Seals | G06Q 10/087 |
| 11,157,954 | B1 * | 10/2021 | Belanger | G06Q 30/0201 |
| 11,488,164 | B2 * | 11/2022 | Gupta | G06Q 20/20 |

(Continued)

FOREIGN PATENT DOCUMENTS

WO    WO 2000/075825 A1 * 12/2000

*Primary Examiner* — Thuy N Nguyen
(74) *Attorney, Agent, or Firm* — Schwegman Lundberg & Woessner, P.A.

(57) ABSTRACT

A cross-entity and cross-retailer platform is provided that captures transaction data (and/or browser history data associated with online browser-based transactions), indexes, and stores the data in a cloud-accessible data store. A cloud service is provided that custom processes retailer and entity-defined workflows based on purchase transactions using the data store. The service discovers and updates trends and patterns associated with item sales for a given retailer or for a given entity across channels associated with in-store and online item sales. The trends and patterns are dynamically reported to the corresponding entity or the corresponding retailer. The entities may comprise manufacturers of an item, a supplier of the item, a distributor of the item, and a Consumer Packaging Goods (CPG) company of the item.

20 Claims, 3 Drawing Sheets

(56) References Cited

U.S. PATENT DOCUMENTS

| | | | | |
|---|---|---|---|---|
| 2004/0002903 | A1* | 1/2004 | Stolfo | G06Q 30/06 705/74 |
| 2011/0251907 | A1* | 10/2011 | Tavares | G06Q 20/20 705/16 |
| 2012/0130792 | A1* | 5/2012 | Polk, Jr. | G06Q 30/0238 705/14.26 |
| 2013/0054357 | A1* | 2/2013 | Mager | G06Q 30/02 705/14.49 |
| 2014/0180790 | A1* | 6/2014 | Boal | G06Q 30/0245 705/14.42 |
| 2014/0180808 | A1* | 6/2014 | Boal | G06Q 30/0211 705/14.53 |
| 2014/0180810 | A1* | 6/2014 | Boal | G06Q 20/209 705/14.53 |
| 2014/0180811 | A1* | 6/2014 | Boal | G06Q 20/209 705/14.53 |
| 2014/0180826 | A1* | 6/2014 | Boal | G06Q 30/0207 705/14.66 |
| 2014/0207592 | A1* | 7/2014 | Kavis | G06Q 40/12 705/21 |
| 2014/0278747 | A1* | 9/2014 | Gumm | G06Q 30/0201 705/7.29 |
| 2014/0280862 | A1* | 9/2014 | Aurisset | H04L 67/535 709/224 |
| 2015/0006427 | A1* | 1/2015 | Notani | G06Q 10/087 705/333 |
| 2015/0310442 | A1* | 10/2015 | Lee | H04L 67/52 705/44 |
| 2015/0356575 | A1* | 12/2015 | Hu | G06Q 30/0202 705/7.35 |
| 2016/0042389 | A1* | 2/2016 | Simmons | G06Q 30/0251 705/14.53 |
| 2017/0193542 | A1* | 7/2017 | Rapaka | G06Q 30/0226 |
| 2019/0180281 | A1* | 6/2019 | Gupta | G06Q 20/209 |
| 2019/0259008 | A1* | 8/2019 | Lindsey | H04L 61/30 |
| 2019/0384655 | A1* | 12/2019 | Krishna Singuru | G06F 9/542 |
| 2020/0202379 | A1* | 6/2020 | Yacoub | G06Q 30/0222 |
| 2021/0192660 | A1* | 6/2021 | Delgado | G06F 30/17 |
| 2021/0279753 | A1* | 9/2021 | Saarenvirta | G06Q 30/0206 |
| 2021/0398194 | A1* | 12/2021 | Sabor | G06F 9/542 |

* cited by examiner

CROSS-ENTITY CHANNEL INTEGRATION SERVICES

BACKGROUND

Currently, suppliers have limited access to retail sales data for the merchandise that suppliers provide to retailers for sale. The sales data contains valuable information for marketing, product promotions, in-store product positioning, inventory, etc. Suppliers spend a significant amount of time and investment each year trying to obtain what data they can from the retailers. A significant time lag currently exists between the time the sales data is generated at the retailers and the time that third-party data service providers are actually able to supply the data to the suppliers (typically, a 4 to 6-week delay).

As a result, suppliers, in the best-case scenarios, receive time lagged sales data with little to no visibility into the their product inventories that are currently in stock with the retailers. Suppliers are usually provided no additional information with the sales data, which would be extremely valuable to the suppliers, such as retail store-level execution of their product promotions or online execution of their product promotions.

One specific area of concern for suppliers are in-store sales data versus online sales data. Suppliers invest a significant amount of resources into marketing to consumers through online partners and in-store partners. Merchandise is often promoted by paying for attractive in-store shelf locations or display locations and/or through commercials, adds, and promotions targeted to specific e-commerce systems. Yet, there is no effective and timely mechanism by which promoted merchandise can be measured against the corresponding investments.

As a result, suppliers are struggling to optimize their promotion campaigns and resource investments in those campaigns. COVID19 emphasized the significance of this problem, as online sales skyrocketed and in-store sales decreased, existing promotion strategies became obsolete and solutions for responding quickly to the situation remained elusive for several months. Consumers experienced a number of product shortages and some consumers switched their preferred product brands and/or changes how they purchased their products in response thereto.

SUMMARY

In various embodiments, methods a system for cross-entity channel integration services are presented.

According to an embodiment, a method for operating a cross-entity channel integration service is presented. As an example, transaction data associated with a transaction is received from a retailer. A trend is updated or discovered for an item category associated with an item of the transaction across transaction channels based on the transaction data and other transaction data associated with other transactions of the retailer and other retailers. The trend is reported to the retailer or to an entity associated with the item.

DETAILED DESCRIPTION

Figure 1:
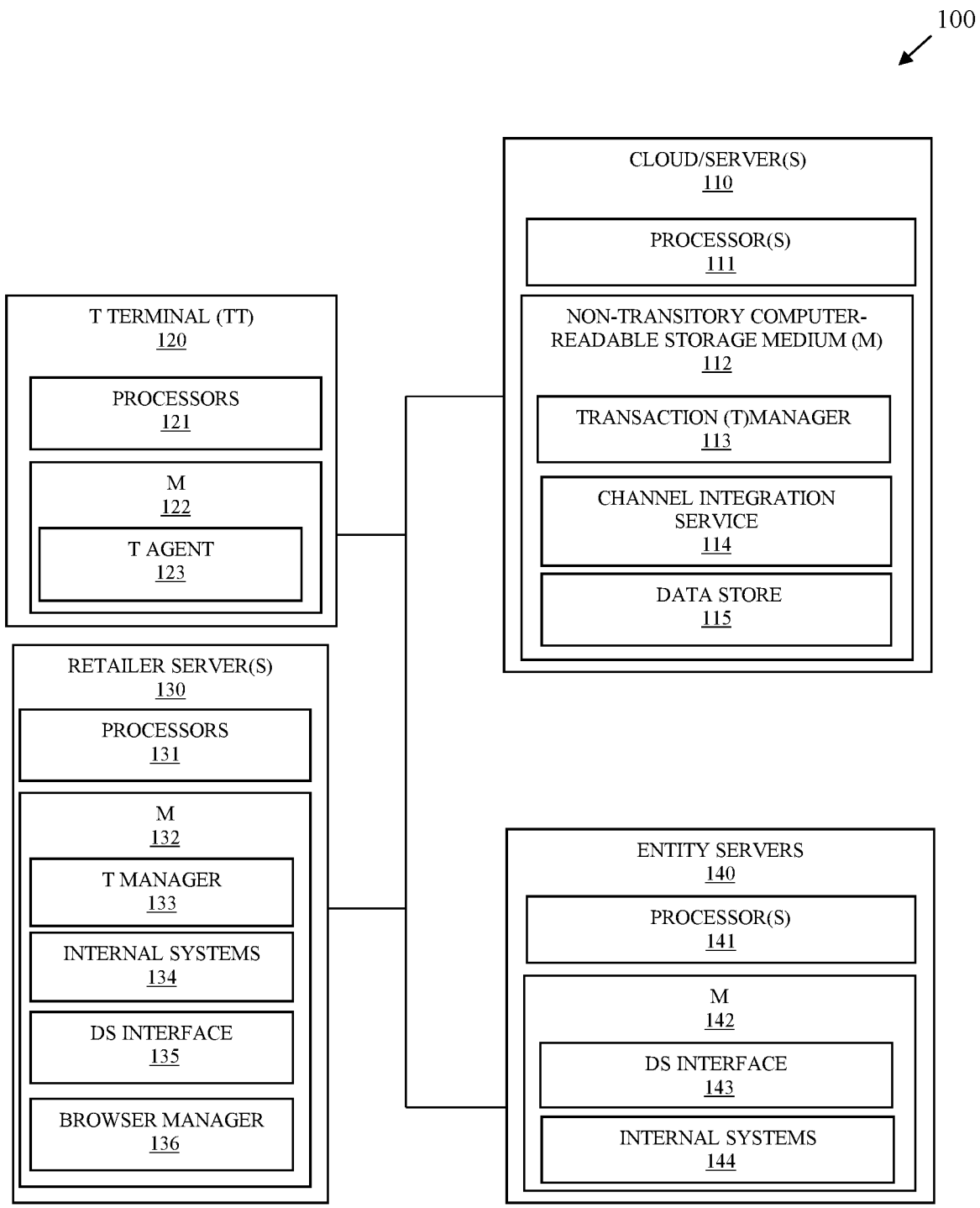
FIG. 1 is a diagram of a system/platform for cross-entity channel integration services, according to an example embodiment.

FIG. 1 is a diagram of a cross-entity system/platform 100 for cross-entity channel integration services, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of the cross-entity channel integration services, presented herein and below.

System/platform 100 (herein after just "system 100") provides a processing environment by which entities (e.g., Consumer Product Goods manufacturers (CPGs), item suppliers, item distributors, and item retailers) can obtain real-time valuable item/product data relationships, correlations, and insights from item/product transactions via a cloud-based service accessible to each of the entities for purposes of modifying and altering decision making by systems of the entities. Further, real-time notifications of item/product transactions are provided to the entities via the service. Transaction data associated with item/product sales are categorized and correlated by entity identifiers, channel identifiers, item codes, item/product type, geographical location, time of year (season), and basket contents within a cloud-accessible data store. An integration service interacts with the appropriate entity inventory systems, planning systems, promotions systems, and/or schedule/delivery systems to provide real-time notice of item/product sales, current trends or current patterns by item and channel, etc. This allows the retailers and the entities to properly account in real time for item/product sales, channel item promotion investments, the trends or patterns, item/product replenishment schedules, item/product manufacture or order schedules, item/product promotions, and item/product delivery schedules.

The integration service dynamically reports the trends or patterns by item and channel to the retailers and entities. For example, the integration service reports that in-store purchases of item category X dropped by N % after COVID19 lockdowns while a supplier (entity) E investment for in-store shelf placement remained unchanged. This is an indication to E that shelf-placement costs/investments can be reduced without altering sales in category X. As another example, sales of item category X through an e-commerce system (E-comm1) is N % while E-comm2 is 3N % during a same reporting period. This may be an indication to E that more investment dollars in promoting category X on E-comm1 may significantly increase sales of category X. In still another example, a targeted advertisement campaign/promotion for product Z on E-comm1 provided N % conversions (redemptions of the promotion by the customers of E-Comm1) while the redemption rate for the same promotion was 3N % on E-comm2. This may be an indication to E that E-comm1 might not be distributing the advertisement and promotion effectively, such that E should pull the promotion from E-comm1 or change how it is provided by E-Comm1.

The term "item" may be used interchangeably and synonymously with the terms "product," "merchandise," and/or "good."

As used herein the term "manufacturer" is used to identify a company that manufactures an item/product. A "supplier" is used to identify a company that supplies the item/product of a manufacturer to a distributor; in some instances, the supplier may also be the manufacturer of the item/product. A Consumer-Packaged Goods (CPG) company is an entity that manufacturers the item/product and then provides the item/product directly to a retailer for resale to a consumer. A distributor is used to identify a company that provides the item/product of a manufacturer (or a supplier that is also the manufacturer) directly to a retailer.

As used herein the term "company" or the term "entity" refers to a manufacturer, a supplier, a CPG, and/or a distributor.

The term "retailer" refers to an organization that resells an item/product directly to the consumer.

A "transaction terminal 120" is a type of device that is used to perform transactions, which may also include a variety of integrated peripheral devices or which may be interfaced to peripheral devices. The peripheral devices may comprise card readers, currency/coin acceptors and dispensers, scanners, weigh scales, integrated scanners with weigh scales, touch displays, cameras, etc.

A consumer device may also be considered a transaction terminal 120 when the consumer device is being operated by a consumer for purposes of performing a transaction, such that in some embodiments, the transaction terminal 120 is a phone, a laptop, a desktop, a tablet, a voice-based network-enabled device (Google® Home®, Amazon® Echo®, etc.), etc. Thus, a consumer device where the consumer purchases an item from a retailer via a browser is considered to be a transaction terminal 120 for that purchase that interacts with a retailer server 130 to purchase the item.

A retail staff operated device can also be a transaction terminal 120 when a staff member operates the device for purposes of performing a transaction on behalf of a customer. The staff operated device may be a Point-Of-Sale (POS) terminal, a tablet, a phone, a laptop, or a desktop.

In some cases, a consumer performs a self-checkout via a transaction terminal 120 located within a retail store, such that in these situations the transaction terminal 120 is a Self-Service Terminal (SST) or a kiosk.

System 100 comprises a cloud/server 110, a transaction terminal 120, retailer servers 130, and entity servers 140.

Cloud/Server 110 comprises at least one processor 111 and a non-transitory computer-readable storage medium 112. Medium 112 comprises executable instructions for a transaction manager 113, channel integration service 114, and a data store 115 (the data store 115 residing in medium 112 and comprising executable instructions for querying and mining the data store 115). The executable instructions when provided to processor 111 from medium 112 cause processor 111 to perform the processing described herein and below with respect to 113-115.

Transaction terminal 120 comprises at least one processor 121 and a non-transitory computer-readable storage medium 122. Medium 122 comprises executable instructions for transaction agent 123. The executable instructions when provided to processor 121 cause processor 121 to perform the processing described herein and below with respect to agent 123.

Each retailer server 130 comprises one or more processors 131 and non-transitory computer-readable storage medium 132. Medium 132 comprises executable instructions for transaction manager 133, internal systems 134, a data store interface 135, and a browser manager 136. The executable instructions when provided to one or more processors 131 from medium 132 cause processors 131 to perform the processing described herein and below with respect to 133-136.

Each entity server 140 comprises one or more processors 141 and non-transitory computer-readable storage medium 142. Medium 142 comprises executable instructions for a data store interface 143 and internal systems 144. The executable instructions when provided to one or more processors 141 from medium 142 cause processors 141 to perform the processing described herein and below with respect to 143-144.

Terminal 120 performs transactions for selling items. Transaction agent 123 of retailer server 130 processes a transaction purchase workflow that interacts with transaction manager 133 for purposes of completing a transaction to sell one or more items to a consumer on behalf of a retailer at the retailer store or online (via a web-based or app-based interface—online transactions may utilize a consumer device as terminal 120 (such as consumer phone, tablet, laptop, desktop, etc.)).

Transaction manager 133 processes purchase transaction workflows through interaction with transaction agent 123. The purchase transaction workflow is enhanced and modified with the teachings presented herein, such that during purchase transaction, transaction manager 133 notifies transaction manager 113 of the transaction along with transaction data (may also be referred to as transaction details) and browser manager 136 reports to transaction manager 113 any browser history data for any transaction being performed via a browser by the consumer. The transaction data and browser history data are gathered by transaction agent 123, by transaction manager 133, and when applicable by browser manager 136 for each retailer's transaction, product/item catalogue, and/or customer loyalty data stores.

Transaction data may comprise, a customer identifier (if available) for the customer associated with the transaction, a customer profile (if available) associated with the customer identifier, item codes for each item (such as Universal Product Code (UPC)) of the transaction, item pricing for each item of the transaction, item category for each item of the transaction, item description for each item of the transaction, a transaction type that identifies an item return transaction versus a purchase transaction, a channel identifier for a channel being used for the transaction (e.g., in person at a POS terminal 120, in person at a SST 120, online via a consumer device acting as terminal 120 through a mobile application of the consumer device, online via a specific e-commerce system using a browser, via a call center through an agent that operates a terminal 120, etc.), transaction identifier for the purchase transaction of all of the items being purchased by the customer, a terminal identifier for the terminal 120, a store identifier for the store associated with the item return, geographical location data for the store, planogram data for shelf locations of the items associated with the transaction within the store, a retailer identifier for the retailer, a transaction history for the customer (if available), entity identifiers for the manufacturer, supplier, distributor, and/or CPG associated with the item codes (there may be one to several entity identifiers for a single item being purchased with the transaction), customer demographic data or customer segmentation data for the customer maintained in the loyalty data store (if available), calendar date for the item return, day of the week for the item return, time of day for the item return, a season associated with the calendar date, promotion identifiers for any promotions redeemed with the items of the transaction, promotion details for each redeemed promotion during the transaction, etc.

Browser history data may comprise: a type of web browser used, a type of device being used with the web browser, e-commerce identifier for the e-commerce system that is processing a transaction of the consumer, searches conducted by the user/customer during a session with a e-commerce site associated with a purchase transaction of the user with a retailer, originating website of the browser before traversing to the e-commerce site, length of time spent by the user/customer on the e-commerce site, location of the consumer device when the e-commerce site was visited, website traversed to by the browser when a session with the e-commerce site ended, locations of the consumer device during each search on the e-commerce site, Operating System (OS) of the consumer device, consumer device model type, current battery level of the consumer device, current display resolution of the consumer device, Internet Protocol (IP) address of the consumer device, etc.

It is noted that some of the browser history data may require authorization for use. It is also noted that the browser history is tracked for the consumer when the consumer traverses to an e-commerce site associated with making the purchase transaction and a session for the consumer with the e-commerce site during the transaction. However, depending upon authorizations provided by the consumer, other browsing history data of the consumer that is unrelated to the e-commerce site may be obtained by browser manager 136 when the consumer is engaged in a transaction with the e-commerce site utilizing transaction agent 123 or by utilizing consumer-authorized cookies placed in the browser of the consumer. In these instances, a complete browsing history of sites visited, searches conducted, time spent on sites, location of the device when each site was visited, etc. may be obtained by browser manager 136 at periodic and configured intervals of time of whenever the consumer visits an e-commerce site.

It is to be noted also terminal 120 may be a mobile device operated by the consumer (consumer device), such that the mobile device reports through transaction agent 123 a current geographical location of the mobile device using the device's location services.

Moreover, transaction data may comprise additional information available to retailer from their data stores or internal systems 134 from what was presented above or less information from what was presented above.

Further, customer profile data (when available) of the may comprise customer contact information (such as mobile device number, email address, social media identifiers, etc.), customer name, customer loyalty level, preferred contact channel of customer (e.g., via email, text, and/or voice call).

Transaction manager 133 sends a transaction identifier for the transaction in real time along with the transaction data/details to transaction manager 113 of cloud 110 as items are purchased and the transaction is processed on terminal 120 and browser manager 136 sends any available browser history data to transaction manager 113 for the transaction (when a browser was used through an e-commerce site).

Transaction manager 113 indexes, links, and stores the transaction data and browser history data within data store 115 based on the retailer identifier for the retailer, e-commerce system identifier (if available), store identifier, item categories or item types for each item of the transaction, the entity identifiers (for the manufacturer, supplier, distributor, and/or CPG) associated with each entity of each item of the transaction, the items' identifiers (UPCs) for the purchased items of the transaction, any promotion identifiers for any promotions redeemed during the transaction, and/or a customer identifier for the customer (if available).

Each record in data store 115 comprises transaction data or transaction details and any available browser history data for the corresponding purchase transaction. Furthermore, some retailers may comprise their own unique entity identifiers for distributors or suppliers, such that transaction/return manager 113 may maintain lookup tables that map a given distributor's or a given supplier's retail-specific entity identifier and associate it to a unique entity identifier for the given distributor or supplier maintained by cloud 110. The manufactured of the purchased items are already assigned unique manufacturer identifiers available within the UPCs (item codes) of the transaction data for the transaction.

In some embodiments, mapping tables to distinguish unique customer identifiers across retailers may also be used by transaction/return manager 113 for purposes of identifying a unique customer across different retailers that is associated with different retailer-assigned customer identifiers. In this embodiment, a globally unique customer identifier for a customer may be maintained and managed by transaction manager 113 across a plurality of retailers.

Channel integration service 114 is notified when records are added to the data store 115. At predefined or configured intervals of time, based on a volume of records added to data store 115, and/or each time a transaction is completed and a record is added to data store 115, channel integration service 114 mines the records associated with any given retailer and/or any given entity and identifies trends or patterns for that retailer and/or entity by channel identifier and/or by promotion identifier for a given item category or a given item across all transactions associated with that item category or item for a given interval or period of time (e.g., current month, previous quarter, current week, last 24 hours, etc.).

Each retailer and entity comprises its own workflow, such that with each additional record added to data store 115, channel integration service 114 obtains that retailer's or that entity's workflow and processes the corresponding workflow. Channel integration service 114 pulls the transaction records that span multiple channels, retailers, and entities associated with the reporting interval and organizes the transaction records by item categories and by the channels (channel identifiers). The organized transaction records are then tabulated into aggregated totals based on tracked metrics defined within the workflow, such as total sales within the item category by unique channel, total promotion redemptions of a specific promotion by unique channel channel, etc. The aggregated totals for the tracked metrics are compared against previously retained aggregated totals for the tracked metrics that were recorded by channel integration service 114 during a last reporting period or the last N number of reporting periods. When the change in the current aggregated totals versus the retained aggregated totals falls above or below a workflow defined percentage or deviation amount/range, the channel integration service 114 identifies the aggregated totals as a new or updated trend or pattern that is to be immediately reported to the corresponding entity and/or retailer. The pattern/trend shows a comparison of the aggregated totals by each channel for each tracked metric is reported out by the channel integration service 114. So, if the tracked metric is total sales of item category X by unique channel, the channel integration service 114 reports out the total sales by each channel when the defined percentage or deviation for at least one of the channels identifies a trend or a pattern along with the aggregated totals for the tracked metrics associated with each of the other remaining channels. The report may also include the previously retained aggregated totals of the previous reporting period for each of the channels for visual comparison and justification to the entity or retailer of the trend/pattern.

The report out may be in an interactive graphical format presented within DS interface 135 and/or 143 that permits the retailer and/or entity to interactively adjust the views of the trend/pattern and vary the degree of detail associated with the records that support the trend/pattern.

Channel integration service 114 receives notification from transaction manager 113 upon insertion of a purchase transaction. Note that this notification may also be detected by channel integration service 114 based on monitoring the data store 115 for insertion of records. The corresponding record from the data store 115 is obtained and the retailer identified along with the entity identifiers (manufacturer identifier available from the UPC (item code) whereas other types of entities (supplier, distributor, or CPG) may require a mapping table lookup based on the retailer identifier for the record that was added to the data store 116).

Channel integration service 114 identifies the transaction type of the record and determines when a transaction type is a purchase transaction as opposed to an item return transaction. Channel integration service 114 accesses workflows for each of the entities and each of the retailers identified in the record associated with a transaction type of the purchase transaction and channel integration service 114 processes each of the workflows using the record, the corresponding tracked metrics for the channels defined in the workflows, the previously retained aggregated totals, and updates or generates any trend/pattern as discussed above. Note that one to several workflows may be processed by integration service 114 and the exact number of workflows is dependent on the entity/retailer identifiers and corresponding entities/retailers having registered a workflow with cloud 110. At least one workflow is processed for one of the entities. The entities' purchase transaction workflows are customized by or for each entity and each retailer.

Additionally, integration service 114 may report the totals and any select information/data directly to the internal systems 134 and 144 of the corresponding retailers and entities via Application Programming Interfaces (APIs) associated with the systems 134 and 144 based on the instructions of the purchase transaction workflows. The tabulated totals may be per unique item identifier, per item category, per channel, per retailer, per geographical region or location that spans multiple different stores of a same retailer or spans multiple different stores of different retailers, and/or per any custom aggregation with custom conditions and/or customer intervals of time/threshold totals defined by the retailer or the entity within the workflow. Moreover, the workflow may define the format and types of data that is to be reported to the internal systems 134 and 144 via the APIs by integration service 114.

Each entity/retailer workflow can custom define what event and/or what aggregated total for what tracked metric (per channel) triggers an automated report out by integration service 114 to internal systems 134 and 144. Specific retailer/entity defined conditions, events, and time intervals can also be defined before an automated report out is triggered.

The internal systems 134 and 144 may comprising inventory systems, loyalty/promotion systems, schedule/delivery systems, ordering systems, etc. This allows for integration of real-time purchase transactions within each internal system 134 and 144.

Thus, integration service 114 acts as a real-time monitor of purchase transactions for each interested retailer and entity and when retailer/entity-defined conditions are met and/or trends/patterns are discovered or changed, aggregated totals and/or select record data can be delivered as input to the retailer's/entity's internal systems 134 and 144. This allows marketing investment and conditions to be changed in real time, such as by decreasing promotional investment planned for a next period in a first channel and increasing promotional investment planned for the next period in a second channel, etc.

System/Platform 100 is completely automated and processed in real time and is employed via data store 115. Data store 115 is maintained and custom mined (based on each retailer's/entity's purchase transaction workflow) by transaction/return manager 113 and channel integration service 114. At the same time, channel integration service 114 continuously discovers new channel trends/patterns and updates existing channel trends/patterns for each retailer/entity using data store 115. Channel integration service 114 delivers channel trends/patterns to the corresponding retailers and entities when needed (based on tracked metrics, accumulated totals for the tracked metrics, and deviations between reporting periods defined within custom workflows for the retailers and entities).

Additionally, both the retailers and the entities can access data store 115 and perform queries and generate reports via interface 135 of retailer servers 130 and via interface 143 of entity servers 140. That is, a user-facing interface to integration service 114 is provided through interface 135 to the retailers and is provided through interface 143 to the entities. The retailers and entities can provide custom search criteria through the user-facing interface to integration service 114. Integration service 114 then processes the search criteria against data store 115 and returns search results back to the entities or retailers via interfaces 143 and 135.

It is to be noted that data store 115 can be organized in any number of manners, such as via tables by retailer, tables by store of retailer, tables by entity, tables by type of item, etc. When integration service 114 processes the workflows, the appropriate tables needed that span multiple different retailers/entities or that are associated with just one retailer/entity or store of the retailer can be searched selectively. In this manner, transaction identifiers are unique for a given retailer or a given store within a given table, but the integration service 114 can search across multiple different tables associated with multiple different retailers/entities when conditions defined in a retailer/entity workflow dictate.

Each entity or retailer can have custom workflows for both item returns and purchase transactions. For example, an entity may have an item return workflow that notifies transaction manager 133 when a predefined total of number of items of a specific type are returned within an entity-set period of time over each of the channels. This can assist the entity in truck load planning and truck route planning. This is but one example and it is to be understood that a variety of retailer and entity-based needs can drive their item return workflows and purchase transaction workflows. Furthermore, the channel-based trends/patterns can be defined within the item return workflow similar to what was discussed above for the purchase transaction workflows, such that channel-based trends/patterns are discovered and reported for both purchase transactions and item returns.

Transaction/Return manager 113, channel integration service 114, and data store 115 collective present and provide a cross-entity channel integration service to the retailers and the entities (providing the features and functions discussed herein). This allows retailers and entities to collaborate and to optimize their channel-based promotional investments and marketing campaigns to optimize merchandise sales.

In an embodiment, the trend or pattern may indicate through browser history data a length of time via a specific e-commerce site that a given promotional advertisement was viewed versus a same promotional advertisement or a different promotional advertisement was viewed via a different e-commerce site. That is, the tracked metrics defined within a given workflow may include aggregated totals by channels within a same channel type (online) for total clicks and/or for total lengths of time that advertisements were viewed on a particular website. So, the tracked metrics and aggregated totals can be associated with specific online activity discovered from the browser history data of the transaction records rather than just total item sales. This allows for channel comparisons within a same channel type based on discovered trends and may provide a good indication of a potential future success or a potential future failure of a given promotion or a given advertisement even before it is reflected in current item sales.

These and other embodiments are now discussed with reference to FIGS. 2-3.

Figure 2:
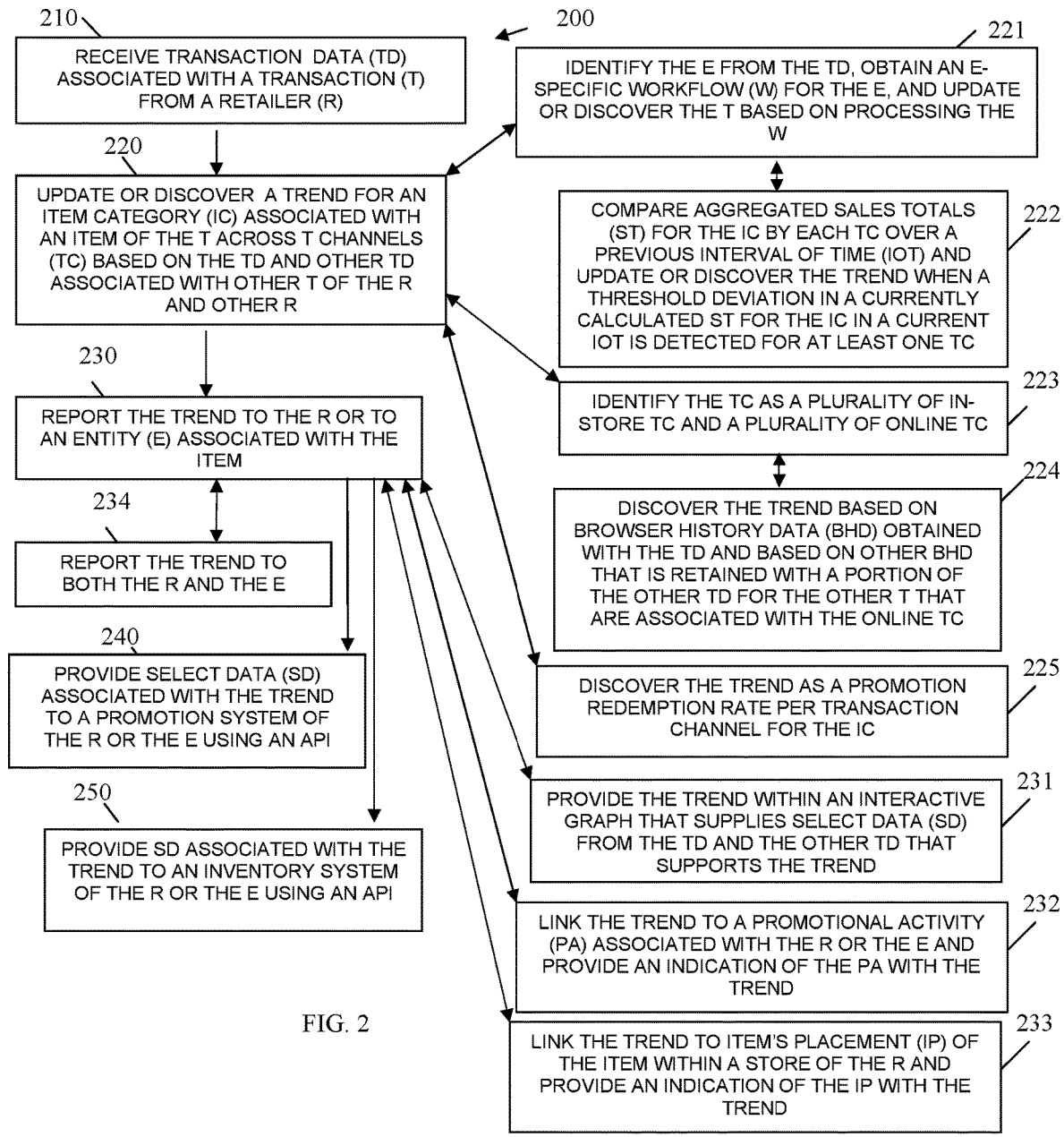
FIG. 2 is a diagram of a method for operating a cross-entity channel integration service, according to an example embodiment.

FIG. 2 is a diagram of a method 200 for operating a cross-entity channel integration service, according to an example embodiment. The software module(s) that implements the method 200 is referred to as a "cross-entity/retailer channel integration service." The cross-entity/retailer channel integration service is implemented as executable instructions programmed and residing within memory and/or a non-transitory computer-readable (processor-readable) storage medium and executed by one or more processors of one or more devices. The processor(s) of the device that executes the cross-entity/retailer channel integration service are specifically configured and programmed to process the cross-entity/retailer channel integration service. The cross-entity/retailer channel integration service may have access to one or more network connections during its processing. The network connections can be wired, wireless, or a combination of wired and wireless.

In an embodiment, the device that executes the cross-entity/retailer channel integration service is cloud 110. In an embodiment, cloud 110 comprises a plurality of servers logically cooperating and accessible as a single server 110 (cloud 110).

In an embodiment, the cross-entity/retailer channel integration service is all or some combination of 113-115.

At 210, the cross-entity/retailer channel integration service receives transaction data associated with a transaction from a retailer.

At 220, the cross-entity/retailer channel integration service updates or discovers a trend for an item category associated with an item of the transaction across transaction channels based on the transaction data and other transaction data associated with other transactions of the retailer and other retailers.

In an embodiment, at 221, the cross-entity/retailer channel integration service identifies the entity from the transaction data, obtains an entity-specific workflow, and updates or discovers the trend based on processing the entity-specific workflow.

In an embodiment of 221 and at 222, the cross-entity/retailer channel integration service compares aggregated sales totals for the item category by each transaction channel over a previous interval of time and updates or discovers the trend when a threshold deviation in a currently calculated sales total for the item category in a current interval of time is detected for at least one transaction channel.

In an embodiment, at 223, the cross-entity/retailer channel integration service identifies the transaction channels as a plurality of in-store transaction channels and a plurality of online transaction channels.

In an embodiment of 223 and at 224, the cross-entity/retailer channel integration service discovers the trend based on browser history data obtained with the transaction data and based on other browser history data that is retained with a portion of the other transaction data for the other transactions that are associated with the online transaction channels.

In an embodiment, at 225, the cross-entity/retailer channel integration service discovers the trend as a promotion redemption rate per transaction channel for the item category.

At 230, the cross-entity/retailer channel integration service reports the trend to the retailer or to an entity associated with the item of the transaction.

In an embodiment, at 231, the cross-entity/retailer channel integration service provides the trend within an interactive graph that supplies select data from the transaction data and the other transaction data that supports the trend.

In an embodiment, at 232, the cross-entity/retailer channel integration service links the trend to a promotional activity associated with the retailer or the entity and provides an indication of the promotional activity with the trend.

In an embodiment, at 233, the cross-entity/retailer channel integration service links the trend to an item's placement or location of the item within a store of the retailer and provides an indication of the item's placement with the trend.

In an embodiment, at 234, the cross-entity/retailer channel integration service reports the trend to both the retailer and the entity.

In an embodiment, at 240, the cross-entity/retailer channel integration service provides select data associated with the trend to a promotion system of the retailer or the entity using an API.

In an embodiment, at 250, the cross-entity/retailer channel integration service provides select data associated with the trend to an inventory system of the retailer or the entity using an API.

Figure 3:
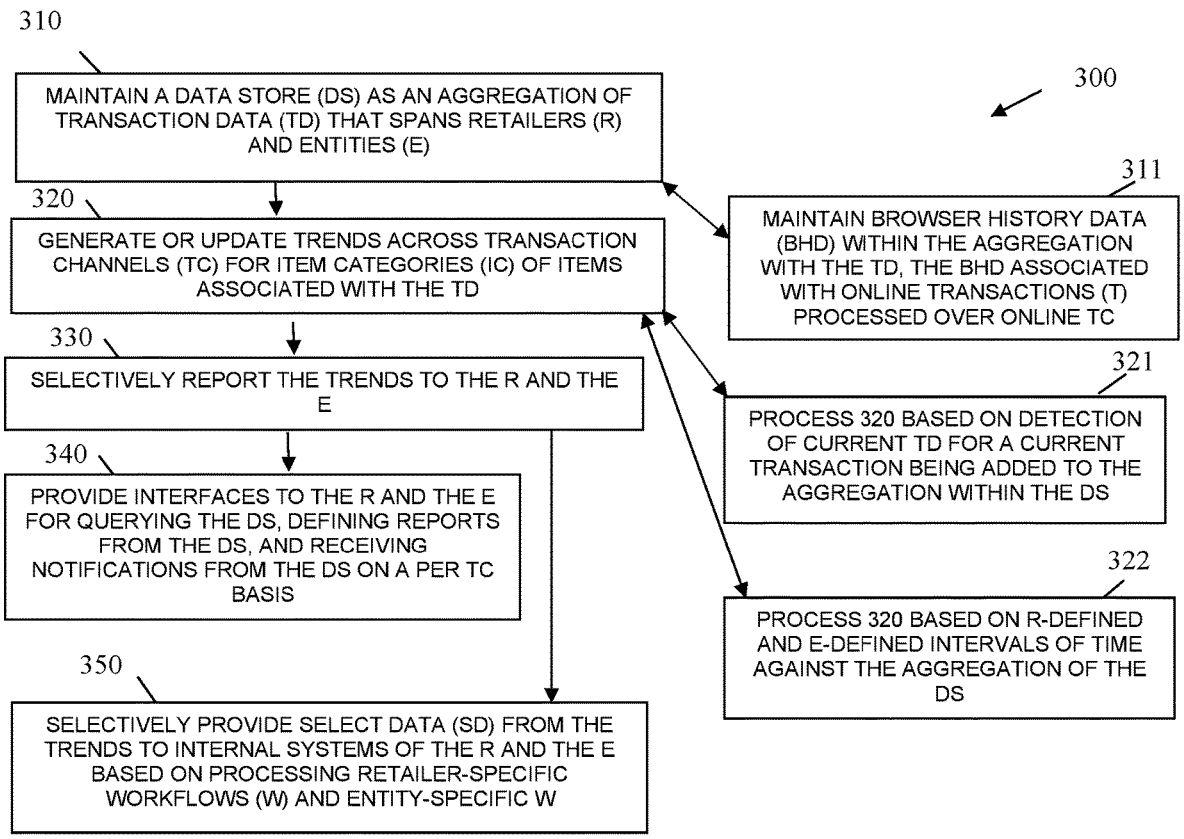
FIG. 3 is a diagram of another method for operating a cross-entity channel integration service, according to an example embodiment.

FIG. 3 is a diagram of another method 300 for operating a cross-entity channel integration service, according to an example embodiment. The software module(s) that implements the method 300 is referred to as a "cloud-based cross entity and cross retailer channel integration service." The cloud-based cross entity and cross retailer channel integration service is implemented as executable instructions programmed and residing within memory and/or a non-transitory computer-readable (processor-readable) storage medium and executed by one or more processors of a device. The processors that execute the cloud-based cross entity and cross retailer channel integration service are specifically configured and programmed for processing the cloud-based cross entity and cross retailer channel integration service. The cloud-based cross entity and cross retailer channel integration service may have access to one or more network connections during its processing. The network connections can be wired, wireless, or a combination of wired and wireless.

In an embodiment, the device that executes the cloud-based cross entity and cross retailer channel integration service is cloud 110. In an embodiment, the device that executes the item return transaction integration manager is server 110.

In an embodiment, the cloud-based cross entity and cross retailer channel integration service is all of or some combination of 113-115 and/or method 200 of FIG. 2.

The cloud-based cross entity and cross retailer channel integration service presents another and, in some ways, enhanced processing perspective of the what was discussed above for cloud 110 and method 200.

At 310, the cloud-based cross entity and cross retailer channel integration service maintains a data store as an aggregation of transaction data that spans retailers and entities (entities defined above as suppliers, manufacturers, distributors, and CPG companies).

In an embodiment, at 311, the cloud-based cross entity and cross retailer channel integration service maintains browser history data within the aggregation of the data store with the transaction data. The browser history data associated with online transactions processed over online transaction channels through a browser.

At 320, the cloud-based cross entity and cross retailer channel integration service generates or updates trends across transaction channels for item categories of items associated with the transaction data.

In an embodiment, at 321, the cloud-based cross entity and cross retailer channel integration service processes 320 based on detection of current transaction data for a current transaction being added to the aggregation within the data store.

In an embodiment, at 322, the cloud-based cross entity and cross retailer channel integration service processes 320 based on retailer-defined and entity-defined intervals of time against the aggregation of the data store.

At 330, the cloud-based cross entity and cross retailer channel integration service selectively reports the trends to the retailers and the entities.

In an embodiment, at 340, the cloud-based cross entity and cross retailer channel integration service provides interfaces to the retailers and the entities for querying the data store, defining reports from the data store, and receiving notifications from the data store on a per transaction channel basis.

In an embodiment, at 350, the cloud-based cross entity and cross retailer channel integration service selectively provides select data from the trends to internal systems of the retailers and the entities based on processing retailer-specific workflows and entity-specific workflows.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
providing executable instructions to a processor of a cloud-based service causing the processor to perform operations, comprising:
receiving transaction data associated with a transaction from a retailer, wherein receiving further includes receiving the transaction data from a purchase transaction workflow associated with transaction details for purchase transactions of the retailer processed on transaction terminals and browsers, wherein the transaction details from the browsers are obtained from browser history data, wherein receiving further includes tracking activity from the browsing history data including tracking total clicks by online transaction channel and length of time per website visited;
maintaining a data store that comprises the transaction data and other transaction data associated with other transactions of the retailer and other retailers via other transaction terminals and other browsers for other purchase transactions, and indexing, correlating, and linking the transaction data and the other transaction data by retailer identifiers, e-commerce identifiers, store identifiers, item categories or item types for each item of each transaction, entity identifiers associated with items of each transaction, item identifiers, promotion identifiers, and customer identifiers within the data store, wherein the data store is cloud accessible to retailer and the other retailers;
maintaining transaction metrics for the transaction data and the other transaction data of the data store, wherein maintaining further includes maintaining aggregated totals for the transaction metrics and previously aggregated totals for the transaction metrics within the data store, wherein the aggregated totals and the previously aggregated totals include at least one custom defined aggregated total for a corresponding transaction metric is customized per each retailer, wherein maintaining further includes maintaining current trends within the data store based on patterns associated with the aggregated totals and the previously aggregated totals;
updating or discovering a trend for an item category associated with an item of the transaction across transaction channels associated with channel identifiers for the transaction channels based on the transaction data and the other transaction data of the data store and based on the previously aggregated totals for the transaction metrics, current aggregated totals for the transaction metrics, and current trends;
providing a platform integrated into workflows for systems of the retailer, the other retailers, and an entity associated with the item via application programming interfaces (APIs) processed within the workflows of the systems, wherein the platform provides integrated collaboration between the retailers, the other retailers, and the entity with respect to the transaction metrics and the trend based on the transaction data and the other transaction data for the item provided by the retailer, the other retailers, and the entity; and reporting the trend to the retailer, a certain one of the other retailers, or the entity through a corresponding API processed within a corresponding workflow of a corresponding system.

2. The method of claim 1, wherein updating or discovering further includes identifying the entity from the transaction data, obtaining an entity-specific workflow for the entity, and updating or discovering the trend based on processing the entity-specific workflow.

3. The method of claim 2, wherein processing the entity-specific workflow further includes comparing aggregated sales totals for the item category by each transaction channel over previous interval of time, and updating or discovering the trend when a threshold deviation in a currently calculated aggregated sales total for the item category in a current interval of time is detected for at least one transaction channel.

4. The method of claim 1, wherein updating or discovering further includes identifying the transaction channels as a plurality of in-store transaction channels and the online transaction channels.

5. The method of claim 4, wherein identifying further includes discovering the trend based on the browser history data obtained with the transaction data and based on other browser history data that is retained with a portion of the other transaction data for the other transactions that are associated with the online transaction channels.

6. The method of claim 1, wherein updating or discovering further includes discovering the trend as a promotion redemption rate per transaction channel for the item category.

7. The method of claim 1, wherein reporting further includes providing the trend within an interactive graph that supplies select data from the transaction data and the other transaction data that supports the trend.

8. The method of claim 1, wherein reporting further includes linking the trend to promotional activity associated with the retailer or the entity and provide an indication of the promotional activity with the trend.

9. The method of claim 1, wherein reporting further includes linking the trend to an item's placement of the item within a store of the retailer and provide an indication of the item's placement with the trend.

10. The method of claim 1, wherein reporting further includes reporting the trend to both the retailer and the entity.

11. The method of claim 1 further comprising:
providing select data associated with the trend to a promotion system of the retailer or the entity using a certain API processed within a certain workflow.

12. The method of claim 1 further comprising:
providing select data associated with the trend to an inventory system of the retailer or the entity using a certain API processed within a certain workflow.

13. A method, comprising:
providing executable instructions to a processor of a cloud-based service causing the processor to perform operations, comprising:
maintaining a data store as an aggregation of transaction data that spans retailers and entities, wherein the entities comprise manufacturers, suppliers, distributors, and Consumer Packaging Goods (CPG) companies associated with items that are sold by the retailers to consumers of the retailers, wherein maintaining further includes receiving the transaction data from purchase transaction workflows associated with transaction details for purchase transactions processed on transaction terminals and browsers, wherein the transaction details from the browsers are obtained from browser history data, wherein maintaining further includes tracking activity from the browsing history data including tracking total clicks by online transaction channel and length of time per website visited;

indexing, correlating, and linking the transaction data by retailer identifiers, e-commerce identifiers, store identifiers, item categories or item types for each item of each transaction, entity identifiers associated with items of each transaction, item identifiers, promotion identifiers, and customer identifiers within the data store, wherein the data store is cloud accessible to each entity;

maintaining transaction metrics for the transaction data of the data store, wherein maintaining further includes maintaining aggregated totals for the transaction metrics and maintaining previously aggregated totals for the transaction metrics within the data store, wherein the aggregated totals and the previously aggregated totals include at least one custom defined aggregated total for a corresponding transaction metric is customized per each entity, wherein maintaining further includes maintaining current trends within the data store based on patterns associated with the aggregated totals and the previously aggregated totals;

generating or updating trends across transaction channels for item categories of items associated with the transaction data using the transaction data and the previously aggregated totals for the transaction metrics, current aggregated totals for the transaction metrics, and the current trends;

providing a platform integrated into workflows for systems of the retailers and the entities via application programming interfaces (APIs) processed within the workflows of the systems, wherein the platform provides integrated collaboration between the retailers and the entities with respect to the transaction metrics and the trends based on the transaction data for the items provided by the retailers and the entities; and selectively reporting the trends to the retailers and the entities through corresponding APIs processed within corresponding workflows of corresponding systems.

14. The method of claim 13 further comprising:
providing interfaces to the retailers and the entities for querying the data store, defining reports from the data store, and receiving notifications from the data store on a per transaction channel basis.

15. The method of claim 13 further comprising:
selectively providing select data from the trends to internal systems of the retailers and the entities based on processing retailer-specific workflows for the retailers and based on processing entity-specific workflows for the entities.

16. The method of claim 13, wherein maintaining further includes maintaining the browser history data within the aggregation with the transaction data, wherein the browser history data associated with online transactions processed over the online transaction channels.

17. The method of claim 13, wherein generating or updating further includes processing the generating or the updating based on detection of current transaction data for a current transaction being added to the aggregation within the data store.

18. The method of claim 13, wherein generating or updating further includes processing the generating or the updating based on retailer-defined and entity-defined intervals of time against the aggregation of the data store.

19. A system, comprising:
- a cloud processing environment comprising at least one server;
- the at least one server comprising a processor and a non-transitory computer-readable storage medium;
- the non-transitory computer-readable storage medium comprises executable instructions; and
- the executable instructions when executed on the processor from the non-transitory computer-readable storage medium cause the processor to perform operations comprising:
  - maintaining a data store comprising transaction data for transactions and any browser history data associated with the transactions, wherein the transaction data and the browser history data span multiple retailers and entities, wherein the entities comprise manufacturers, suppliers, distributors, and Consumer Packaging Goods (CPG) companies associated with items that are sold by the retailers to consumers of the retailers, wherein maintaining further includes receiving the transaction data from purchase transaction workflows associated with transaction details for purchase transactions processed on transaction terminals and browsers, wherein the transaction details from the browsers are obtained from browser history data, wherein maintaining further includes tracking activity from the browsing history data including tracking total clicks by online transaction channel and length of time per website visited;
  - indexing, correlating, and linking the transaction data by retailer identifiers, e-commerce identifiers, store identifiers, item categories or item types for each item of each transaction, entity identifiers associated with items of each transaction, item identifiers, promotion identifiers, and customer identifiers within the data store, wherein the data store is cloud accessible to each entity;
  - maintaining transaction metrics for the transaction data of the data store, wherein maintaining further includes maintaining aggregated totals for the transaction metrics and maintaining previously aggregated totals for the transaction metrics, wherein the aggregated totals and the previously aggregated totals include at least one custom defined aggregated total for a corresponding transaction metric is customized per each entity, wherein maintaining further includes maintaining current trends within the data store based on patterns associated with the aggregated totals and the previously aggregated totals;
  - deriving trends for item categories of items associated with the transactions across multiple transaction channels comprising in-store transactions and the online transactions based on processing workflows specific to the retailers and the entities and based on the previously aggregated totals for the transaction metrics, current aggregated totals for the transaction metrics, and the current trends of the data store;
  - providing a platform integrated into workflows for systems of the retailers and the entities via application programming interfaces (APIs) processed within the workflows of the systems, wherein the platform provides integrated collaboration between the retailers and the entities with respect to the transaction metrics and the trends based on the transaction data for the items provided by the retailers and the entities; and
  - selectively providing interactive graphical data representing the trends through corresponding workflows of corresponding systems using corresponding APIs to interfaces associated with the retailers and the entities.

20. The system of claim 19, wherein portions of the transaction data is received in real time from the transaction terminals of the retailers for the in-store transactions and received in real time from consumer devices operated by consumers for the online transactions.

* * * * *